C. C. CHAPMAN.
BOX END STAPLING MACHINE.
APPLICATION FILED NOV. 21, 1908.

921,588.

Patented May 11, 1909.
7 SHEETS—SHEET 6.

Witnesses:
John Enders
Chas. H. Buell

Inventor:
Chester C. Chapman
By Dyrenforth, Lee, Chritton & Wiles
Attys.

UNITED STATES PATENT OFFICE.

CHESTER C. CHAPMAN, OF SOUTH BEND, INDIANA, ASSIGNOR TO NATIONAL WIRE BOUND BOX COMPANY, A CORPORATION OF INDIANA.

BOX-END-STAPLING MACHINE.

No. 921,588.  Specification of Letters Patent.  Patented May 11, 1909.

Application filed November 21, 1908. Serial No. 463,747.

*To all whom it may concern:*

Be it known that I, CHESTER C. CHAPMAN, a citizen of the United States, residing at South Bend, in the county of St. Joseph and State of Indiana, have invented a new and useful Improvement in Box-End-Stapling Machines, of which the following is a specification.

My invention relates to improvements in the construction of machines for use, more especially, in stapling box-ends to the cleats of wire-bound box-blanks.

In the manufacture of wire-bound boxes the box-ends are secured against the inner sides of the end-cleats of the blank, and as the said ends are usually of thinner lumber than the cleats the staples employed for fastening the parts together are driven from the inner sides of the ends through the latter into the cleats. The operations of assembling the parts of a box and moving them during the end-stapling operations are performed by hand, and for convenience in handling and positioning the parts of the box during this operation the staples are driven in the upward direction.

My object is to provide a stapling machine of comparatively simple, durable and generally improved construction adapting it for convenient use in fastening box-ends.

In carrying out my invention I prefer to provide the machine with means for forming the staples as well as driving them. The staple-forming mechanism is toward the rear of the machine, and extending forward therefrom to the staple-driving mechanism is a stationary guide for the staples. Means coöperate with the guide for advancing the staples along the latter intermittingly, and the guide is formed between its ends with a suitable turn or twist. For convenience in handling the staples they are delivered to the guide in an upright position, and as they are advanced along the guide they are upset, owing to the turn in the latter, so that they are delivered from the guide to the driving mechanism in inverted condition as required.

In the accompanying drawings, which illustrate my improved machine as I prefer to construct it, Fig. 8, an enlarged broken vertical section taken on line 8 in Fig. 3.

The frame of the machine comprises a hollow stand-portion 20 and an upper forward-projecting portion bifurcated vertically and horizontally and presenting the upper skeleton-arm 21 and lower skeleton arm 22.

23 is a drive-shaft carrying the power-pulley 24 and pinion 25. A shaft 26 carries a normally loose gear 27 driven by the pinion 25. Keyed to the shaft 26, adjacent to the gear 27, is a collar 28. At the gear 27 and collar 28 the shaft is provided with a longitudinally extending semi-circular recess 29 registering with a similar recess in the collar 28. The said recesses together form a bearing for a short rock-shaft 30 carrying an arm 31 projecting through a segmental recess in the collar 28, beyond the circumference of the latter. At the inner circumference of the hub of the gear 27 is a recess and the rock-shaft 30 has a semi-cylindrical end-portion resting in the recess or groove 29 where it is surrounded by said hub. When the arm 31 is in the position indicated in Fig. 19 the rock-shaft is turned at its semi-cylindrical portion out of engagement with the recess in the gear-wheel 27, whereby the latter rotates without rotating the shaft 26. When the arm 31 is drawn by the spring 32 to the end-surface 33 of the segmental recess in the collar, the semi-cylindrical portion of the rock-shaft 30 turns into the recess in the hub of the gear-wheel, when they register, thereby causing the gear-wheel to turn the shaft.

Figures 8, 19:
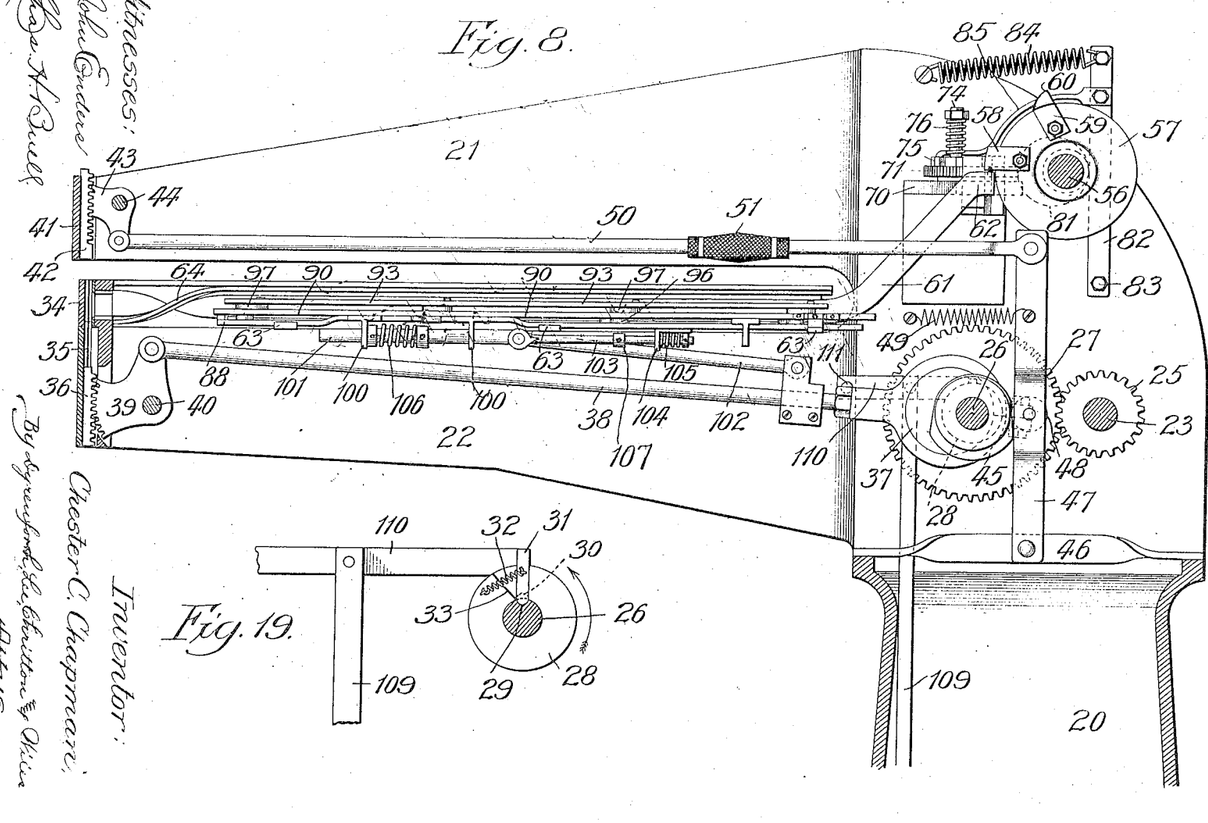

The construction of clutch described is well known and is frequently employed where a shaft or the like is to be clutched to a rotating body and perform one revolution only, stopping always in one position. A more detailed illustration and further explanation of the clutch in the present connection is thought, therefore, to be unnecessary.

Figures 3, 4, 5, 6:
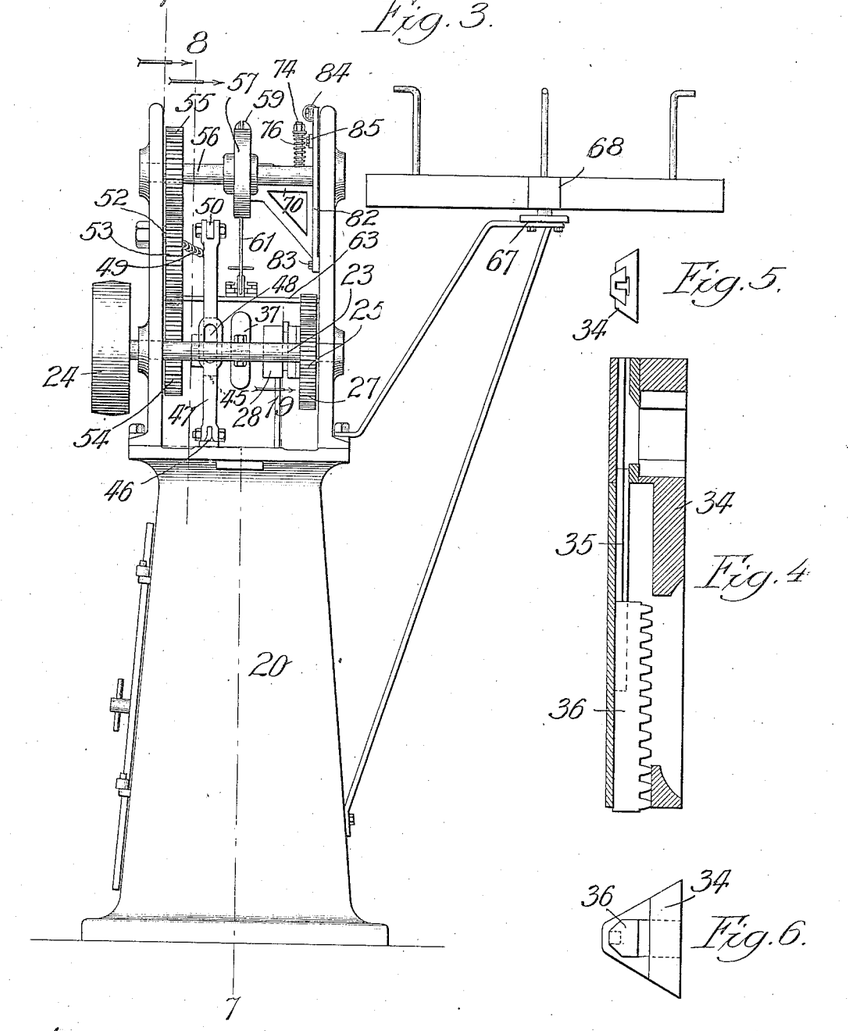
Fig. 3, a rear elevation.
Fig. 4, an enlarged vertical section of the lower part of the forward end of the machine showing the staple-driving bar and adjacent features.
Figs. 5 and 6, top and bottom plan views, respectively, of the staple-driving mechanism shown in Fig. 4.
Figure 7:
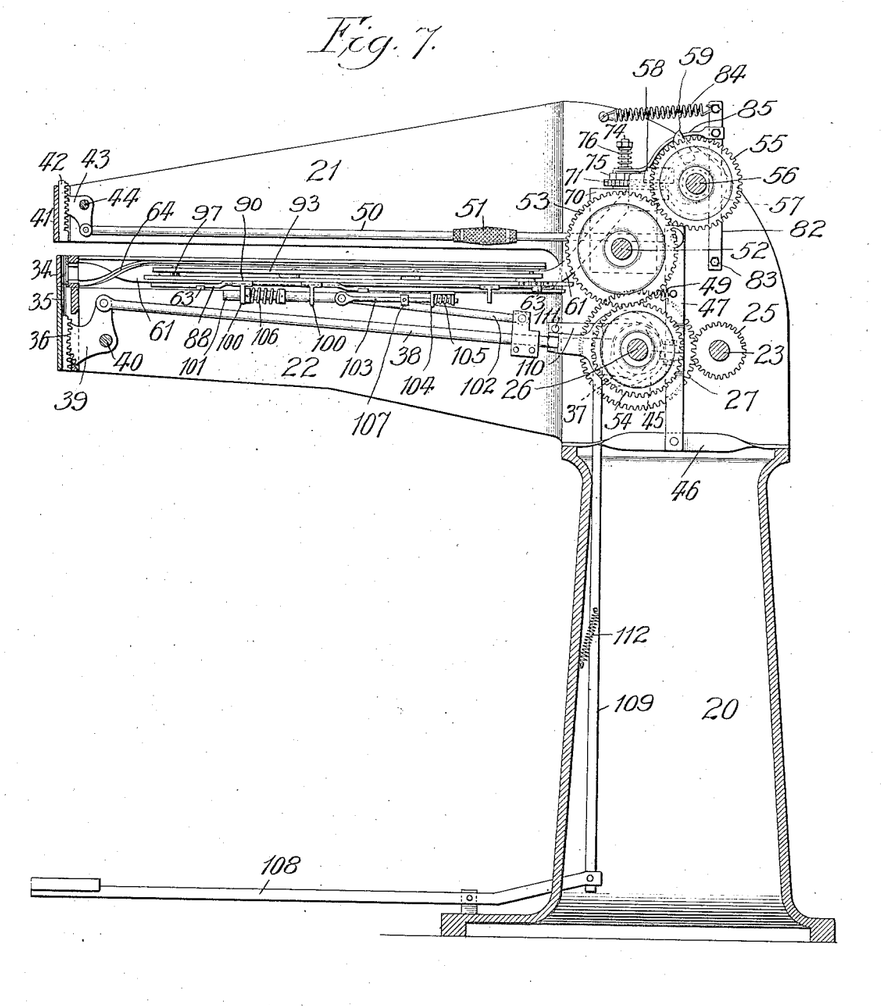
Fig. 7, a vertical section taken on line 7 in Fig. 3.

Mounted to slide in a vertical guide 34 in the forward end of the arm 22 is a stapler, or staple-driving bar, 35 provided along its lower end-portion with a rack 36. On the shaft 26 is a cam or eccentric 37 attached to which is a connecting-rod 38 pivotally secured eccentrically at its forward end to a swinging segment-gear 39 pivoted at 40 and engaging the rack 36. Mounted in a guide 41 in the forward end of the arm 21 is a reciprocal anvil or clencher-bar 42 having its rear face formed into a rack. This rack is engaged by a segment-gear 43 pivoted at 44. The shaft 26 carries a cam 45. Fulcrumed upon a stationary cross-bar 46 is a lever 47 provided between its ends with a roller 48 which rides upon the cam 45, being held thereto by a spring 49. Extending from the upper end of the lever 47 is a connecting-rod 50 provided between its ends with a turnbuckle 51 by means of which it may be lengthened and shortened. The connecting-rod is secured eccentrically to the segment-gear 43 at is forward end. In each rotation of the shaft 26 the segment-gears 39, 43 are moved to plunge the driving-bar 35 and anvil-bar 42 toward then away from each other.

Figures 9, 10, 11, 12:
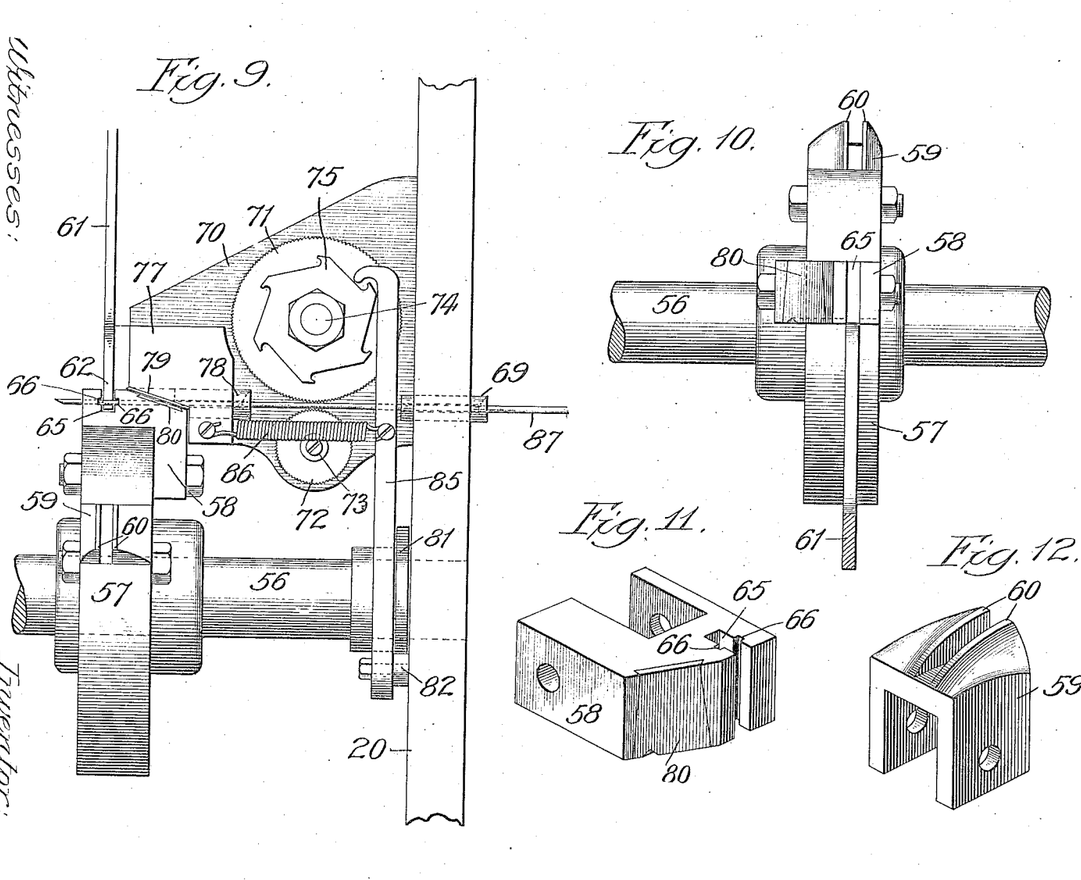
Fig. 9, an enlarged broken plan view of wire-feeding and cutting and staple-forming mechanism (the spring 84 being omitted)
Fig. 10, a broken front elevation of a rotary wire-cutting and staple-forming and initially advancing disk, and showing the staple-guiding bar in section.
Fig. 11, a perspective view of a wire-cutting and staple-forming block on the rotary disk.
Fig. 12, a similar view of a block on the disk for advancing the staples initially along the guide-bar.

On a stub-shaft 52 is an idle-gear 53 meshing at one side with a gear 54 on the shaft 26 and at another side with a gear 55 on a shaft 56. The shaft 56 carries a disk 57 to which is secured a wire-severing and staple-wire-bending block 58 (see Fig. 11). The disk also carries a block 59 having projecting cams 60 (see Fig. 12).

Figure 13:
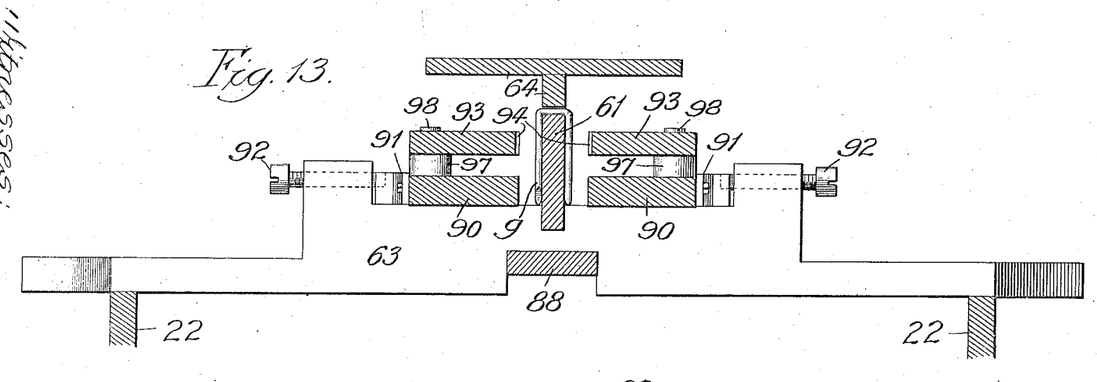
Fig. 13, an enlarged transverse section taken on line 13 in Fig. 2.

61 is a staple-guide consisting of a narrow bar extending from a point close to the disk 57 to a point close to the staple-driving bar 35. At its rear portion the bar 61 extends horizontally a short distance to present a staple-forming mandrel 62. From the mandrel portion the bar inclines downward, as shown, and extends thence horizontally forward. The bar is supported on cross-bars 63 (see Fig. 13) fastened to the arm 22 of the main frame. Near its forward end, in the preferred construction, the bar is twisted or rendered spiral, the turn being equal to a half circle. Supported to extend parallel with the horizontal portion of the bar 61 above and out of contact therewith is a bar 64 which, at the spiral portion of the bar 61, describes the same curve to the under side of the bar and terminates at the guide 34. The block 58 has a recess 65 at which it passes across opposite sides of the mandrel 62; and extending from opposite sides of the recess are staple-forming sockets 66.

Mounted upon the side of the machine is a support 67 for a staple-wire reel 68, and extending through the wall of the frame of the machine is a wire-straightening guide 69. On the inner side of the said wall is a shelf or bracket 70.

71 and 72 are companion, serrated, staple-wire feed-wheels. The wheel 72 is journaled on a suitable stub-shaft or screw 73 fastened to the shelf 70, and the wheel 71 is journaled upon a stub-shaft 74 extending upward from the shelf. Integral with the wheel 71 is a ratchet-wheel 75 and on the stub-shaft 74 is a spring 76 pressing downward upon the wheel-device 71, 75 and operating as a brake. The shelf or bracket 70 carries a block 77. The bite of the serrated wheels is in line with the wire guide 69 and in line with both is a perforated wire guide 78 extending through the block 77. The said block is formed with an inclined vertical face carrying a wire-shearing blade 79. The block 58 is provided with an inclined face also fitted with a wire-shearing blade 80 which, in the rotation of the disk 57, shears past the blade 79. The shaft 56 carries a cam 81.

82 is a lever fulcrumed at 83 and held to bear between its ends against the cam 81 by a spring 84. Extended from the lever 82 is an arm 85 bent at its free end to form a pawl which is held in engagement with the ratchet 75 by a spring 86.

A staple-wire 87 drawn from the reel 68 passes through the guides 69, 78, being engaged between the guides by the feed-wheels 71, 72. In each rotation of the shaft 56 the lever 82 is swung by the cam 81 to turn the ratchet-wheel 75 and advance the staple-wire from the guide-opening at 78 over the top of the mandrel 62. In the next rotation of the shaft 56 and disk 57 the shearing-blade 80 coöperates with the stationary blade 79 to sever the wire at an angle, and as the severing is completed the recessed portion of the block 58 passes across the mandrel 62, thereby bending the severed length of wire into a staple. The staple is formed in the recesses or sockets 66 and when the block 58 passes the mandrel the staple is left straddling the latter in upright position. During the further rotation of the disk 57 the cams or pushers 60 move down opposite sides of the mandrel and force the finished staple from the mandrel on to the inclined portion of the bar 61 down which it slides while maintaining its upright position.

Figure 14:
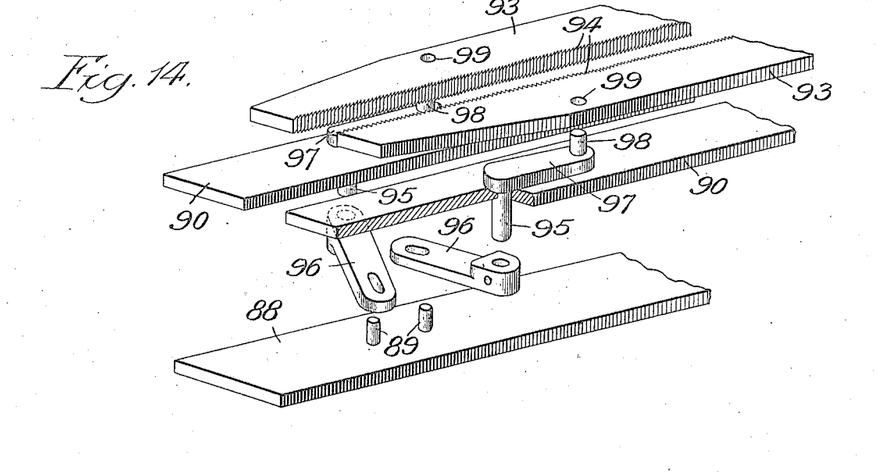
Fig. 14, an enlarged broken perspective view of mechanism for feeding the staples along the guide-bar, the parts being detached from each other for purposes of illustration.
Figures 15, 16:
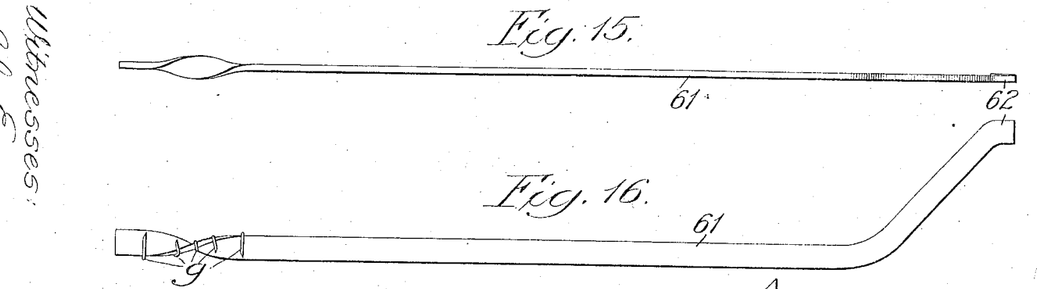
Figs. 15 and 16, top and side views, respectively, of the staple guide-bar of preferred construction.

Extending beneath and parallel with the horizontal portion of the bar 61 is a reciprocal bar 88 provided with a pair of pins 89 (see Fig. 14) near its forward end and with a similar pair of pins near its rear end. The bar is supported against the under sides of the cross-bars 63. Resting on the cross-bars 63 at opposite sides of the staple-guiding bar 61 are companion bars 90. On the outer edges of the bars 90 are socket pieces 91 engaged by set-screws 92 on one or more of the bars 63. The set-screws may be turned to position the bars 90 toward or away from the bar 61, but prevent longitudinal movement of the bars 90. Above and parallel with the bars 90 are staple-feeding bars 93 extending along opposite sides of the bar 61 and having serrated inner surfaces 94. Journaled in the bars 90 are short vertical rock-shafts 95 provided below the bars 90 with cranks 96 and above the said bars with cranks 97. The lower cranks pivotally engage the pins 89 on the longitudinally movable bar 88, and the upper cranks have pins 98 engaging openings 99 in the bars 93.

On the under side of the bars 90, and secured thereto, are guides 100 for a reciprocal rod 101 connected by a rod 102 with the connecting-rod 38. Pivotally connected with one end of the rod 101 is a rod 103 passing through a bracket 104 on the under side of the bar 88. Surrounding the rod 103 on its end portion is a buffer-spring 105 and on the rod 101 between the guides 100 is a buffer 106 adapted to contact with the forward guide 100 and cushion the rod in its forward stroke. In the forward plunge of the connecting-rod 38, which retracts or moves down the staple-driving bar, the buffer 105 engages the stop or bracket 104 and moves the bar 88 yieldingly forward to swing the cranks 96, 97 and move both bars 93 in the arc of a circle toward opposite sides of the bar 61. In their movement along opposite sides of the bar 61 they engage the staples g and move them a distance equal to the diameter of the staple-wire. In the return movement of the connecting-rod 38, which operates the staple-driver to drive the staples, a collar 107 on rod 103 engages the bracket 104 and moves the bar 88 in the backward direction, thereby turning the cranks and turning the bars 93 backward and away from the bar 61. Thus in each back-and-forth movement, or vibration, of the companion bars 93 the staples are engaged and advanced, as described, the said engagement being rendered yielding by the buffer-springs.

As before stated, the drive-shaft 23, pinion 25 and gear 27 rotate constantly. A treadle or foot-lever 108 is connected with a vertical rod 109 which at its upper end is connected with a lever or latch 110 fulcrumed at 111 upon the main frame. A spring 112 tends normally to lower the rod 109 and raise the treadle, thereby lowering the latch 110 into the path of the clutch-arm 31. Engagement of the latch with the clutch-arm releases the clutch and the shaft 26 and all the parts driven thereby remain stationary with the staple-driving bar 35 lowered and the anvil-bar 42 raised.

Figures 1, 2:
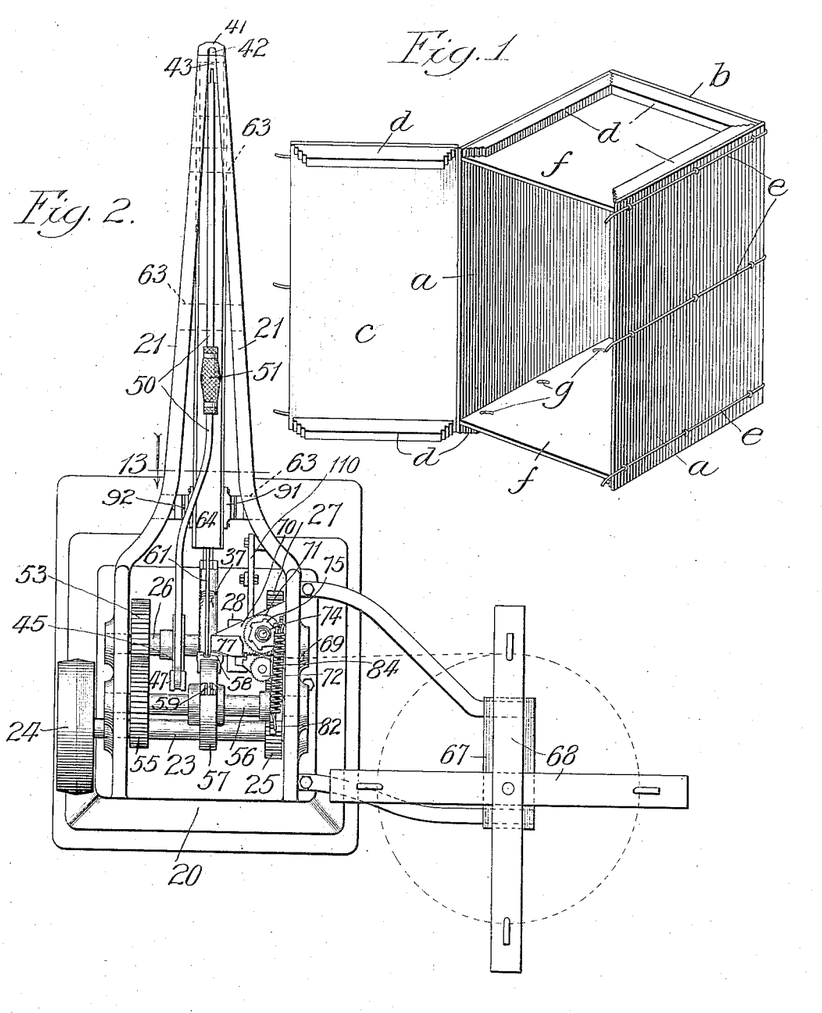
Figure 1 is a perspective view of a wire-bound box showing the way the staples are applied to fasten the box-ends to the cleats.
Fig. 2, a top plan view of a machine.

In the manufacture of wire-bound boxes of the type illustrated in Fig. 1, the blank consisting of the side-sheets a, bottom-sheets b and cover-sheets c, with the cleats d and binding-wires e, all stapled or "stitched" together, is formed in a box-blank-making machine. The present machine is employed to fasten the ends f in place by means of the staples g driven from the inner side of the box through the ends f into the cleats. The operator bends the parts a, b around an end f with the latter against the under faces of the cleats leaving the cover open, as indicated in Fig. 1. He then passes the end into the gap or opening between the arms 21, 22 of the machine, resting it upon the platform formed by the latter. He moves the assembled box material along, positioning it over the staple-driver where staples are to be driven. To drive a staple he presses down the foot-lever 108 to raise the latch 110 and permit the gear-wheel 27 to clutch and rotate the shaft 26. A staple which has been fed in upset position into the guide 34 above the driver 35 is driven upward, the anvil-bar 42 being at the same time pressed downward upon the cleat to insure the staple's being driven home. While a staple is being thus driven another staple is formed at the disk 57 and discharged on to the guide-bar 61. In practice the staples fill out at least the horizontal portion of the bar 61 one against the other. During the retracting movements of the staple-driver and anvil-bar the feed-bars 93 are moved as described to advance the row of staples a distance equal to the diameter of the staple-wire, thereby delivering an upset staple from the bar 61 into position in the guide 34. The operator, after forcing down the treadle, releases it immediately so that in each operation the shaft 26 rotates but once. The assembled box-material is moved along by the operator to the next position and the operations thus repeated until the box-end has been fastened in place. He then reverses the box, inserts another box-end and repeats the operation.

Figures 17, 18:
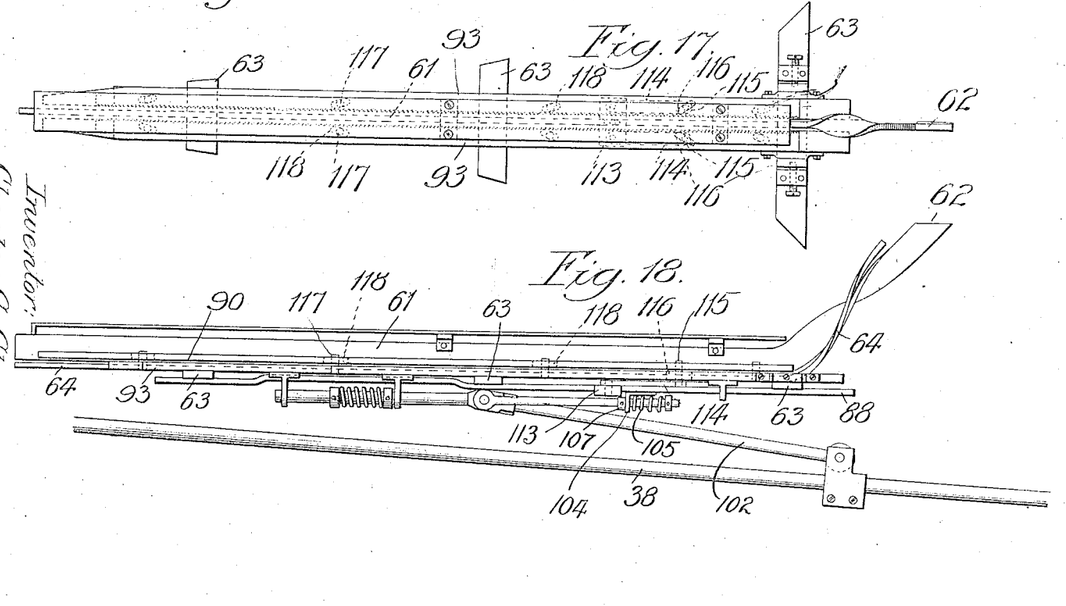
Figs. 17 and 18, broken plan and side views, respectively, of a modified construction wherein the twist in the guide-bar is toward its rear end; and Fig. 19, an enlarged broken section on line 19 of Fig. 3 showing starting and stopping clutch-mechanism.

The only material difference between the preferred construction of guide-bar 61 and the construction thereof shown in Figs. 17 and 18 is that the spiral or twist is near the rear end instead of near the forward end of the bar. In the modification the retaining-bar 64 extends along the under side of the horizontal length of the bar 61. The gap or opening between the arms 21 and 22 is wider than the thickness of any cleats and box-ends to be stapled; and by lengthening or shortening the rod 50 by means of the turn-buckle 51 the throw of the anvil-bar may be adjusted to properly engage the upper side of the cleat when the staple is driven. Figs. 17 and 18 also illustrate a modified construction of staple-advancing means. The bar 88 is reciprocated as before explained, and carries a cross-plate 113 connected by means of pivotal links 114 with pins 115 carried by the serrated bars 93. The pins pass through slots 116 in the immovable bars 90, the slots being inclined as indicated by the dotted lines. The features 89, 95, 96, 97 and 99, of the preferred construction described, are dispensed with and in their place pins 117 on the bars 90 extend through inclined slots 118 in the serrated bars 93. Through their pivotal connection with the bar 88, as described, the bars 93 are reciprocated, and, owing to the engagement of their slots 118 with the pins 117, they are moved to engage staples, in their forward thrust, and release the staples in their backward thrust. They thus operate to feed the staples along the bar 61 in practically the same way as the preferred construction.

What I claim as new and desire to secure by Letters Patent is—

1. In a stapling machine of the character described, the combination with mechanism for driving staples in an upward direction, of a stationary staple-directing and inverting guide leading to said mechanism, for the purpose set forth.

2. In a stapling machine of the character described, the combination with the staple-supply and mechanism for driving staples in an upward direction, of a staple-directing and inverting guide extending from the staple-supply to said mechanism, for the purpose set forth.

3. In a stapling machine of the character described, the combination with mechanism for driving staples in an upward direction, of a staple-guide leading to said mechanism at one end and adapted, at its opposite end-portion, to receive staples in upright position, and means for advancing the staples along the guide to said mechanism, the guide being formed with a staple-inverting turn between its ends, for the purpose set forth.

4. In a stapling machine of the character described, the combination with mechanism for driving staples in an upward direction, of a staple-guiding bar leading to said mechanism at one end and adapted, at its opposite end-portion, to receive staples in upright position, and means for advancing the staples along the bar to said mechanism, the bar being formed with a staple-inverting turn between its ends, for the purpose set forth.

5. In a stapling machine of the character described, the combination of staple-forming mechanism, means for driving staples in an upward direction, a staple-guide extending to said staple-driving means at one end and adapted, at its opposite end-portion, to receive staples in upright position from said staple-forming mechanism, and means for advancing the staples along the guide, the guide being formed with a staple-inverting turn between its ends, for the purpose set forth.

6. In a stapling machine of the character described, the combination with means for driving staples in an upward direction, of staple-forming mechanism having an anvil over which the staples are formed in upright position, and a staple-guiding bar forming a continuation of said anvil and leading to said staple-driver, the bar being formed with a staple-inverting turn between its ends, for the purpose set forth.

7. In a stapling machine of the character described, the combination with mechanism for driving staples in an upward direction, of a stationary staple-directing and inverting guide leading to said mechanism, and intermittently-actuated staple-engaging and advancing feed-mechanism between the ends of said guide, for the purpose set forth.

8. In a stapling machine of the character described, the combination with the staple-driving mechanism, of a staple-directing guide leading thereto at one end, a mandrel at the other end of the guide, means coöperating with said mandrel for forming staples and delivering them to the guide comprising a rotary disk, a bifurcated staple-wire-bending block on the disk movable across opposite sides of the mandrel, means for feeding staple-wire across the mandrel, and severing means for the wire.

9. In a stapling machine of the character described, the combination with the staple-driving mechanism, of a staple-directing guide leading thereto at one end, a mandrel at the other end of the guide, means coöperating with said mandrel for forming staples and delivering them to the guide comprising a rotary disk, a bifurcated staple-wire-bending block on the disk movable across opposite sides of the mandrel, means for feeding staple-wire across the mandrel, severing means for the wire, and a staple-advancing pusher on the disk.

10. In a stapling machine of the character described, the combination with the staple-driving mechanism, of a staple-carrying and directing guide-bar leading to said mechanism and intermittently-actuated staple-advancing bars at opposite sides of said guide-bar provided with serrated staple-engaging faces.

CHESTER C. CHAPMAN.

In presence of—
KATHRYN T. PARKS,
H. E. CREAGER.